US011765435B2

(12) United States Patent
Rudi et al.

(10) Patent No.: US 11,765,435 B2
(45) Date of Patent: Sep. 19, 2023

(54) TEXT TAGGING AND GRAPHICAL ENHANCEMENT

(71) Applicant: SONY INTERACTIVE ENTERTAINMENT LLC, San Mateo, CA (US)

(72) Inventors: Olga Rudi, San Mateo, CA (US); Courtney Yingling, San Mateo, CA (US); Kristine Young, San Mateo, CA (US); Tatianna Manzon-Gutzman, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/490,807

(22) Filed: Sep. 30, 2021

(65) Prior Publication Data
US 2023/0102807 A1 Mar. 30, 2023

(51) Int. Cl.
*H04N 21/488* (2011.01)
*H04N 21/43* (2011.01)
*H04N 21/84* (2011.01)
*H04N 21/439* (2011.01)

(52) U.S. Cl.
CPC ..... *H04N 21/4884* (2013.01); *H04N 21/4307* (2013.01); *H04N 21/4394* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 2008/0279535 A1* | 11/2008 | Haque | H04N 21/435 386/E5.042 |
| 2013/0141551 A1* | 6/2013 | Kim | H04N 5/445 348/51 |
| 2018/0302687 A1* | 10/2018 | Bhattacharjee | H04N 21/4884 |
| 2019/0196675 A1* | 6/2019 | German | G06V 30/414 |

* cited by examiner

Primary Examiner — James R Marandi
(74) Attorney, Agent, or Firm — POLSINELLI LLP (57) ABSTRACT

Systems and methods for text tagging and graphical enhancement of subtitles in an audio-visual media display are disclosed. A media asset associated with an audio-visual display that includes one or more speaking characters may be received by a text tagging and graphical enhancement system. A set of sounds from the audio-visual display corresponding to speech by one of the speaking characters is identified. The set of sounds corresponding to the identified speaking character may be analyzed and one or more vocal parameters is identified, each vocal parameter measuring an element of one of the sounds. A display of subtitles synchronized to the speech of the identified speaking character within the audio-visual display may be generated. The appearance of the subtitles may be modified based on the identified vocal parameters for each of the corresponding sounds.

16 Claims, 8 Drawing Sheets

TEXT TAGGING AND GRAPHICAL ENHANCEMENT

BACKGROUND OF THE INVENTION

Field of Invention

The present invention generally relates to providing subtitles. More specifically, the present invention relates to modifying appearance of subtitles.

Description of the Related Art

Audio-visual content is widely available today in a variety of forms, including television, movies, livestreams, video games, and other digital content (including user-generated content such as YouTube® videos). Typically, audio-visual content files may be presented with options for accessibility, such as text subtitles that may be added to transcribe any speech presented during play of a given content file. The text subtitles can be supplied in association with the content file or can be transcribed automatically during playback of a video (e.g., by a transcription or dictation computer program). Subtitles may be enabled by a user in a variety of situations where audio alone may not be clearly discernible or comprehensible. For example, the user may suffer from a hearing impairment and may not be able to discern dialogue from audio. There may be background noise that may drown out or otherwise interfere with the ability to discern audio. The user—who may currently lack access to or may be uncomfortable using headphones or other personal audio accessories—may also wish to avoid turning up the volume (e.g., while someone is sleeping in the same room or to maintain privacy in public settings). In yet further cases, the dialogue in certain content titles may be spoken in a language or accent that the user may not be familiar with such that text may be more immediately comprehensible than speech.

Some subtitle systems may provide options for adjusting the appearance of subtitle text. Such options may include text size, font or typeface, color, or text-box color. Such options may be provided by the content title itself, a source of the content title (e.g., streaming service), or the user device used to access and present the content title. Currently, such text presentation options are static and limited in scope or complexity. Such options are generally applied across the board to all audio, regardless of the meaning or significance of the different portions of speech or sounds within the audio.

Some subtitle systems may also inadvertently spoil events by presenting entire subtitled sentences (or that describe other sounds) before the on-screen speaker actually completes the sentence or before other on-screen events actually occur. Such timing misalignment may arise when predefined subtitles are not correctly synchronized to the timing in which they are spoken or sounded on-screen. For example, displaying an entire sentence, side of a dialogue, or a textual description of an on-screen noise may result in a viewer being able to finish reading the subtitle before the on-screen speech or event associated with the on-screen noise actually occurs. Reading the subtitle ahead of the actual speech or event may decrease the impact of a reveal or an emotional interchange between characters. Further, subtitles may be displayed at the very edges (e.g., bottom or top) of the viewing screen, thereby forcing the eyes of a reader to disengage from the characters, actions, and events in the middle of the screen to read the text. Even if the subtitles do not block significant parts of the scene being displayed, important facial expressions, gestures, and other actions taken by the characters may be missed entirely due to the viewer looking towards a different part of the screen to read the subtitles. Such subtitle conditions may therefore detract from the user experience and lessen enjoyment of the content.

Further still, subtitles may include literal translations across different languages, and wherein the subtitles may include culturally-specific slang or figures of speech, the literal translations may not necessarily convey the intent of displayed scene to users who are unfamiliar with the culture or figures of speech. As a result, the user may misinterpret the conversation or line of dialogue, resulting in confusion and a poor user experience.

Therefore, there is a need in the art to provide improved systems and methods for presenting subtitles by way of text tagging and graphical enhancement.

SUMMARY OF THE CLAIMED INVENTION

Systems and methods for text tagging and graphical enhancement of subtitles in an audio-visual media display are disclosed. A media asset associated with an audio-visual display that includes one or more speaking characters may be received by a text tagging and graphical enhancement system. A set of sounds from the audio-visual display corresponding to speech by one of the speaking characters is identified. The set of sounds corresponding to the identified speaking character may be analyzed and one or more vocal parameters is identified, each vocal parameter measuring an element of one of the sounds. A display of subtitles synchronized to the speech of the identified speaking character within the audio-visual display may be generated. The appearance of the subtitles may be modified based on the identified vocal parameters for each of the corresponding sounds.

DETAILED DESCRIPTION

Systems and methods for text tagging and graphical enhancement of subtitles in an audio-visual media display are disclosed. A text tagging and graphical enhancement system may receive a media asset associated with an audio-visual display that includes one or more speaking characters. A set of sounds may be identified from the audio-visual display corresponding to speech by one of the speaking characters. The set of sounds corresponding to the identified speaking character may be analyzed to identify one or more vocal parameters, each vocal parameter measuring an element of one of the sounds. A display of subtitles may be generated and synchronized to the speech of the identified speaking character within the audio-visual display. The appearance of the subtitles may be modified based on the identified vocal parameters for each of the corresponding sounds.

Figure 1:
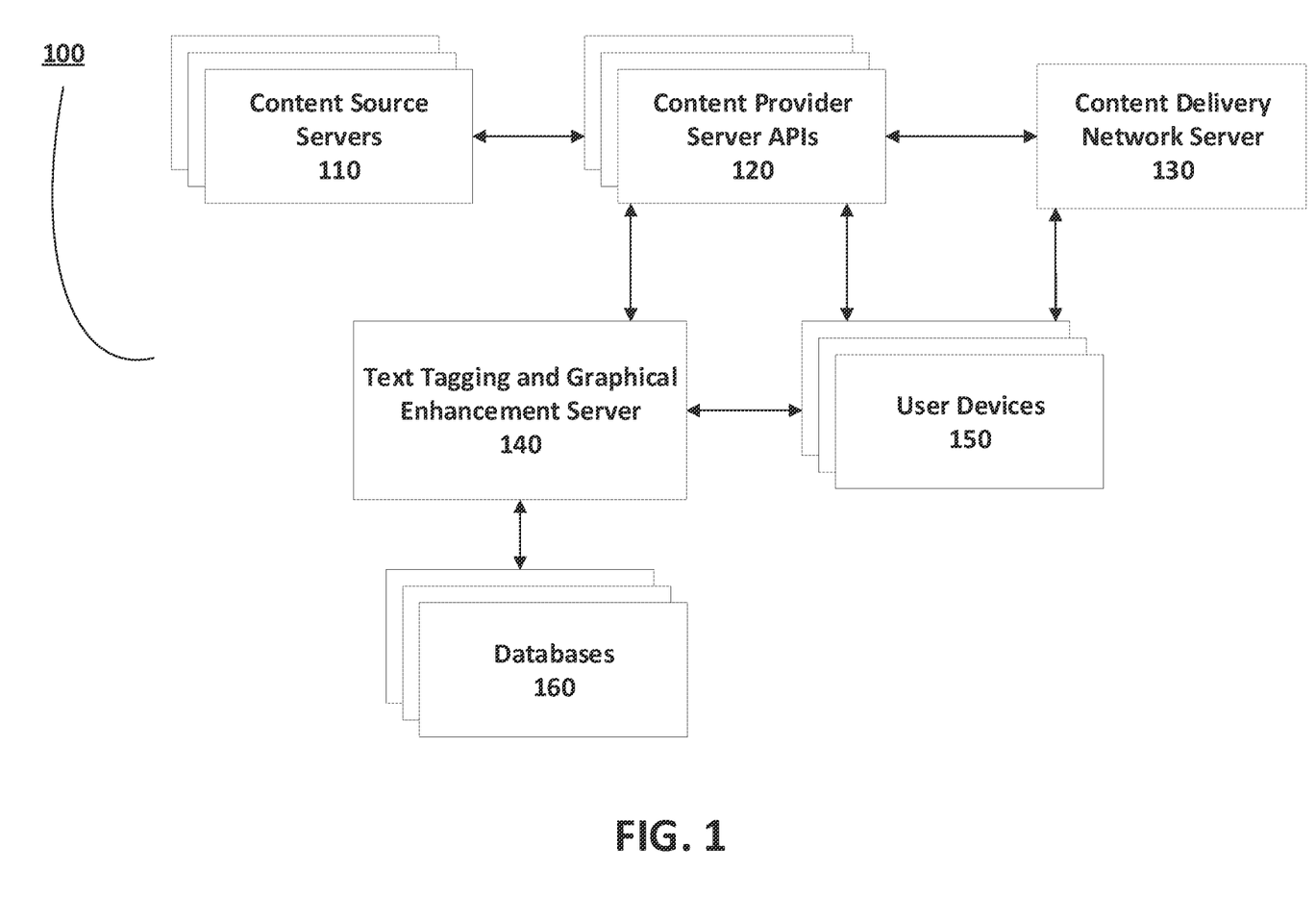
FIG. 1 illustrates a network environment in which a system for text tagging and graphical enhancement may be implemented.

FIG. 1 illustrates a network environment 100 in which a system for text tagging and graphical enhancement may be implemented. The network environment 100 may include one or more content source servers 110 that provide audio-visual media content (e.g., television, movies, video games, etc.) for distribution, one or more content provider server application program interfaces (APIs) 120, content delivery network server 130, a text tagging and graphical enhancement server 140, one or more user devices 150, and one or more databases 160. The devices in network environment 100 communicate with each other using one or more communication networks, which may include a local, proprietary network (e.g., an intranet) and/or may be a part of a larger wide area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles, which may further be associated with object data regarding a digital or virtual object (e.g., activity information, subtitle text, language translations for audio and text, character information, player information, other game media information, etc.) displayed in a digital or virtual environment during an interactive session or playback of media content.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available as to be compatible with a variety of different user device 150. In a network environment 100 that includes multiple different types of content source servers 110, content delivery network servers 130, text tagging and graphical enhancement server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., character or actor information, subtitle text, metadata) can be usable to provide details about the content or service being provided to the user device 150.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Text tagging and graphical enhancement server 140 may include any data server known in the art that is capable of communicating with the different content source servers 110, content provider server APIs 120, content delivery network server 130, user devices 150, and databases 160. Such text tagging and graphical enhancement server 140 may be implemented on one or more cloud servers that carry out instructions associated with audio-visual media content. The text tagging and graphical enhancement servers 140 may further carry out instructions, for example, to apply computer vision, extract metadata from scenes of an audio-visual content media, identify characters or background imagery in a media content file, and may modify a presentation of the media content file based on the extracted metadata and identification of on-screen entities in an audio-visual media content item.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a computing device that may include any number of different gaming consoles, mobile devices, laptops, and desktops.

Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 8. Each user device 150 may be associated with participants (e.g., players) or other types (e.g., spectators) of users in relation to a collection of digital media content.

While pictured separately, the databases 160 may be stored on any of the servers and devices illustrated in network environment 100 on the same server, on different servers, or on any of the user devices 150. Such databases 160 may store or link to various subtitle libraries, metadata catalogs and categorizations, and graphically enhanced subtitle text repositories. In addition, databases 160 may store language profiles, as well as translation models that may be specific to a particular user, user category, media content title, genre, language category, etc. and may be utilized in processes described herein for enhancing subtitles accompanying a media content file. One or more user language profiles may also be stored in the databases 160 for each user.

Figure 2:
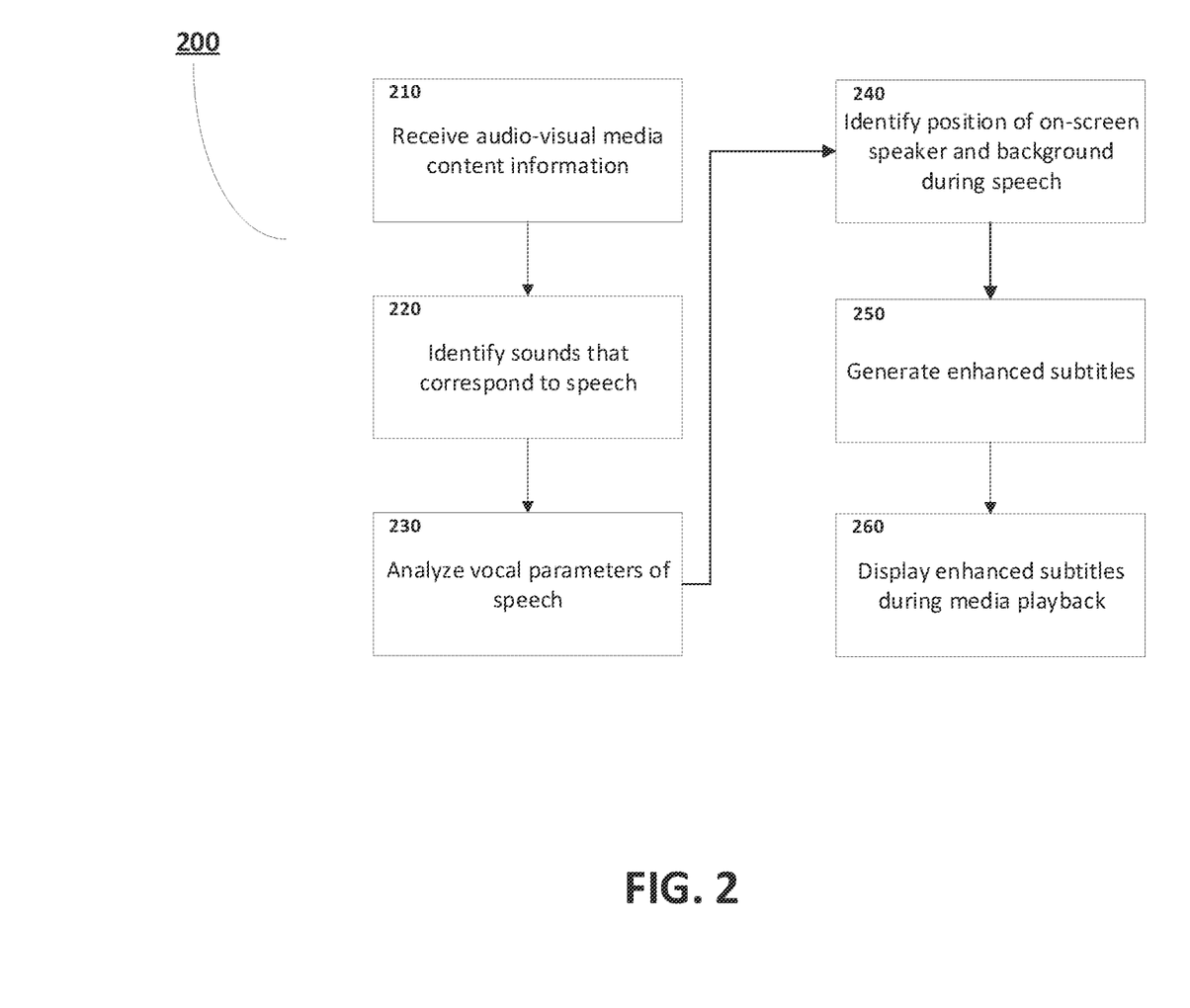
FIG. 2 is a flowchart illustrating an exemplary method for providing text tagging and graphical enhancement in an audio-visual content file.

FIG. 2 is a flowchart illustrating an exemplary method 200 for providing text tagging and graphical enhancement in an audio-visual content file. The steps identified in process 200 of FIG. 2 are exemplary and may include various alternatives, equivalents, or derivations thereof including but not limited to the order of execution of the same. The steps of the process 200 of FIG. 2 and any alternative similar processes may be embodied in hardware or software including a computer-readable storage medium including instructions executable by the likes of a processor in a computing device. The exemplary process 200 illustrated in FIG. 2 may be performed repeatedly during the use of an entertainment system.

In step 210, an audio-visual media content file and information relating to the file are received by a text tagging and graphical enhancement server 140. The audio-visual media content file may include various forms of digital media, such as television, feature films, shorts, user-generated content from externally hosted video databases (e.g., YouTube), video games, trailers, and any other type of video content that may be subtitled. The text tagging and graphical enhancement server 140 may review the audio-visual content file being presented by a user device. The audio-visual media content file may contain additional information beyond the audio-visual media content, such as a subtitle text file, language translation files for subtitle text and audio, images, and predetermined sets of metadata. The metadata delivered with the audio-visual media content file may contain information categorizing and detailing the media content file, such as genre, title, duration, characters/actors/cast list, etc.

In step 220, the text tagging and graphical enhancement server 140 may identify sounds that correspond to speech, music, sound effects, and other background sounds in the audio of an audio-visual media content item. Sounds corresponding to speech may be isolated by the text tagging and graphical enhancement server separate from music, sound effects, and other audio that occurs in a scene. Text tagging and graphical enhancement server 140 may isolate sounds corresponding to speech from other types of audio based on a comparison of the audio to waveforms corresponding to human speech, musical instruments, and miscellaneous sound effects.

Various algorithms may be used to assess an audio waveform for comparison to human speech, musical instruments, and miscellaneous sound effects. Further, sample waveforms may be stored in database 160 and retrieved by the text tagging and graphical enhancement server 140 to provide a baseline for comparison to the audio waveforms extracted from the audio-visual media content item. Sample waveforms may include a variety of audio tracks and variations of each track, such as different ages and genders of human voices, different tonalities in speech, different emotions in speech, different volumes of speech, different timbres of speech, different paces of speech, different pitches of speech, different musical instruments, and different types of sound effects.

Further still, audio tracks may be compared to a subtitle file associated with the audio-visual media content item, which may contain timestamps and dialogue characters may speak. Isolation of audio tracks may include determining when the dialogue of one character ends and dialogue of another character begins. The text tagging and graphical enhancement server 140 may store isolated copies of the audio for speech, music, sound effects, and other audio in database 160. Isolated copies of audio tracks may be maintained in database 160 for an indefinite amount of time and may be used in later steps for analysis in providing enhanced subtitle text. The isolated copies of audio tracks may be retrieved from database 160 by the text tagging and graphical enhancement server 140 and may be sent to user devices 150 or to content delivery network server 130 via content provider server APIs 120 upon other user requests to play, view, download, or stream the audio-visual media content file.

In step 230, the text tagging and graphical enhancement server 140 may analyze the isolated audio for speech to determine vocal parameters during dialogue. Analysis of dialogue may measure and store information corresponding to sounds associated with various parameters of speech in the audio-visual media content item, such as volume, pitch, timbre, pace, pauses, and intonation. Parameters of speech may be measured individually in spoken words and as a comparison of progression throughout a line of dialogue. Changes in parameters of speech in a line of dialogue as it progresses throughout a sentence or phrase may be used by the text tagging and graphical enhancement server 140 in identifying metadata categories and determinations within a metadata category associated with a speech dialogue. Metadata categories associated with dialogue may include various types of information corresponding to aspects of a character, scene, and speech, such as tonality, emotion, volume, actor or speaker vocalizing the dialogue, and context from the surrounding scene and speech.

For example, the text tagging and graphical enhancement server 140 may analyze speech in a scene that contains an argument between a first speaker and a second speaker. The first speaker may be identified based on low pitch and above average volume audio waveforms and on-screen associated imagery, and may be assigned a default font and typographical emphasis for speech, such as a bold serif style font. The second speaker may be based on speech audio containing different pitch and different volume than the first speaker, and may be assigned a different, less pronounced font, such as an italicized, thin-lined serif font. Parameters of speech in the beginning of a sentence may be detected from the first speaker to be spoken at a loud volume above average speaking level (75 dB), a moderate pace (140 words per minute), and a mid-range pitch (110 Hz), while speech at the end of a sentence may be spoken at a louder volume (85 dB), a more rapid pace (170 words per minute), and at a higher pitch (180 Hz), which may indicate the speaker is becoming increasingly angry or frustrated. In such an example, metadata categories and determinations, such as "Volume: Shouting; Emotion: Furious; Tone: Scathing; Context: Argument; Character: First Speaker" may be assigned to the sentence of speech dialogue for the first character. The second speaker may be assigned different metadata categories and determinations based on the next sentence or phrase spoken by the second speaker. Such metadata categories and determinations may be assigned to individual words, phrases or entire sentences in speech.

Identification of background sound, such as isolated music tracks, sound effect tracks, and other non-speech audio may also be analyzed in step 230. Different metadata categories may be assigned to background sounds than metadata categories associated with speech audio. The text tagging and graphical enhancement server 140 may detect and identify elements of music, such as instrument types, tempo, melody, harmony, rhythm, note structure, and dynamics that have been isolated as background sound by executing instructions on a processor for algorithms capable of analyzing the waveform of the music track. Further, the music track may be compared to sample waveforms stored on database 160 as a method of identifying metadata categories for the music. For example, a music track may play over a scene of a climactic battle that contains minimal speech audio. The text tagging and graphical enhancement server 140 may detect instruments such as trumpets, bass drums, timpani, cymbals, French horns, cellos, violins, pianos, and other woodwinds playing in the music track and the algorithm may identify an orchestral piece of music. Metadata categories and determinations may be assigned to the music track in the audio-visual media content item based on the algorithms analysis of the waveform, such as "Instruments: Orchestra, Woodwinds, Brass, Percussion, Strings; Tempo: 140 BPM; Structure: Fast; Mood: Tense."

In step 240, the text tagging and graphical enhancement server 140 may identify a position of a speaker on-screen during speech in the audio-visual media content item. The position of the speaker on-screen may be identified through a variety of processes that isolate a face, body parts, or other features of the speaker that may be in motion during vocalization of words and phrases. Detection of pixel-motion, facial recognition, and object movement in a video scene may be determined by algorithms executed by a computer processor on each section of video in an audio-visual media content item corresponding to a same section of audio playback in which speech is detected in step 220. In one embodiment, the result of the execution of any combination of algorithms to detect motion of the speaker may include an XY Cartesian coordinate related to the horizontal and vertical distance measured in pixels from the center of a video display and may indicate a central position of the speaking character as the speaker moves throughout the scene. XY coordinates of the speaker may be stored for each frame of an audio-visual media content item where speech is detected to track the position of the speaker. Such tracked position of the speaker is utilized in placing the subtitles in step 260. As the position of the speaker changes, the placement of the subtitle may be dynamically updated. Alternatively, the position of the subtitle may remain static for a line of dialogue and updated at the start of the next line of dialogue based on the changed position of the speaker.

In another embodiment, a speaker position may be identified in a prerendered video, such as a television show, movie, or theatrical trailer. A video portion corresponding to a speech dialogue portion may transition through multiple camera angles during a single portion of dialogue. The computer processor may execute instructions to apply detection algorithms repeatedly as necessary for each transition or camera angle during the speech of a speaking character.

In a different embodiment, a speaker position may be identified in on-demand video rendering, such as during gameplay in a video game. During on-demand video rendering, in addition to using pixel-motion detection, facial recognition, and gesture detection algorithms, the text tagging and graphical enhancement server 140 may receive position data of an in-game speaking character from an entertainment system or user device 150. An entertainment system used for gameplay of a video game, and described in further detail in FIG. 8, may track positional data as the processor renders character models on-screen in a 2D or 3D game world and may send positional data to the text tagging and graphical enhancement server 140 for use in tracking a character position when speech occurs.

Multiple speakers may be detected in a video scene, and each speaker may correspond to an isolated audio track of speech determined in steps 220 and 230. The video scene of the audio-visual media content item may contain multiple camera angles, individual speakers, and non-speaking characters and objects. When multiple speakers may be present in the video scene, the detection algorithms may be used repeatedly to isolate each speaker in relation to each isolated audio track of speech.

Optionally, unoccupied background space of a scene around a speaking character, also referred to as negative space, may be identified using the same processes and algorithms designed to identify a speaker. In a video scene where the speaker or speakers may be identified, regions of the display that registered a negative result in detecting a speaker may be determined to be negative space. Negative space may be tracked throughout the scene where a speaker is also tracked to isolate available on-screen regions that a speaker is not occupying. Further, motion detection of non-speaking characters and objects may be incorporated in identifying negative space. Non-speaking characters and objects visual representation may also act as an important on-screen component during dialogue of a scene, and as such, negative space detection may be narrowed to avoid obfuscating the delivery of information in a scene beyond speech itself. The identified negative space is utilized in placing the subtitles in step 260.

In addition to background space of a scene, the negative space may further be defined overlaying speaking or non-speaking characters in the scene. Non-moving portions of a speaking or non-speaking character may be considered as negative space and may be detected for use in displaying subtitles. For example, a speaking character may be sitting while speaking a line of dialogue in a video section. The face, hands, and arms of the speaking character may be detected as in-motion during the video section of the scene corresponding to the speaker dialogue, while the torso, legs, and feet of the speaking character may be non-moving. The torso, legs, and feet regions of the speaking character may be considered by the text tagging and graphical enhancement server 140 as eligible regions for displaying a subtitle in the video section.

In certain embodiments, eligible regions for displaying a subtitle may be determined by the text tagging and graphical enhancement server 140 based on a combination of the identified speaking character, unoccupied background space, and other non-moving portions of a scene. The text tagging and graphical enhancement server 140 may prioritize action-less regions of the screen when selecting regions for subtitle display in order to avoid obscuring any on-screen action or movement of a scene.

Such analyses discussed in relation to steps 220-240 may result in one or more tags being associated with different portions of the audio and associated subtitles. Such tags may characterize type of audio, volume, tone, emotion, context, associated speaker or object, speaker/object location, etc. Based on such tags, the text tagging and graphical enhancement server 140 may generate enhanced subtitles in step 250. Each speaking character, music track, sound effect, or other audio track may be assigned different fonts, colors, positions and emphasis as a default text setting for displaying dialogue in a subtitle. Fonts, colors, and emphasis assigned to a speaking character may also be used in displaying subtitles of a different speaking character by altering aspects of the text, such as increasing font size, adjusting color saturation, or adjusting color brightness. For example, if a speaking character is assigned a color, the modification to the subtitle may only occur by changing size, color saturation or brightness, but not in the hue of the color. Modifications to the subtitle that would otherwise assign a different color to the subtitle may be effectuated by changing other aspects of the subtitle than color. Other characters in the scene or in the audio-visual media may not use the same or similar color as the color assigned to the character.

In some embodiments, different visual and animated effects may be applied to one or more individual words within a set of subtitles on display. For example, comic book-style bubbles may be used to identify speaker, and thought bubbles may be used for voiceover narration. Some types of content files may include commentary, which may also be provided in thought bubbles to visually distinguish such commentary from on-screen dialogue. Other effects may include motion effects, where one or more words may be animated to correspond to a detected emotion. For example, dialogue identified as being associated with anger may be presented in throbbing animated text, while dialogue identified as being associated with happiness may be presented in dancing animated text.

Measurements of vocal parameters, metadata categories, and metadata determinations of a speaking character or a line of dialogue may be associated with a text enhancement library stored on databases 160. The text enhancement library may contain various text modifications including examples such as increasing or decreasing font size, updating font type, updating font emphasis (e.g. bold, italic, underline, etc.), updating font color or gradient, updating font opacity, applying font animation, and adding static or animated images to text of a subtitle. Vocal parameters, metadata categories, and metadata determinations may be associated with one or more modifications available in the text enhancement library. The text tagging and graphical enhancement server 160 may apply various available modifications to a letter, word, phrase or entire sentence of speech dialogue based on the assigned metadata and parameter measurements.

Further, the text tagging and graphical enhancement server 140 may generate enhanced subtitles using stored thresholds of vocal parameters detected in dialogue of a speaking character. Thresholds of vocal parameters may be set by the text tagging and graphical enhancement server based on a variety of factors including known benchmarks for speech measurements and relative measurements of a line of dialogue, scene, or speaker. Subtitle text of a character that passes a threshold may be modified based on a combination of factors including the type of threshold, the amount a measurement passes a threshold, the word or words spoken while above or below a threshold, and the duration a threshold is surpassed during speech, among others. The modification to subtitle text in dialogue that has passed a threshold during speech may include variations in opacity, color, font, animation, added imagery, and more.

Known benchmarks for speech used to set thresholds in a text tagging and graphical enhancement server may include examples such as typical speaking volumes or pace for word delivery in a conversation. For example, a typical speaking volume for human speech may be measured at 60 dB, a whisper at 30 dB, and yelling or shouting at 90 dB. Subtitles for a speaking character vocalizing a word, phrase, or entire sentence that passes above or below such a volume threshold during speech may be modified for the duration that the threshold is passed.

In another embodiment, relative measurements may also be used to determine thresholds instead of known benchmarks. Relative measurements may account for a character that has a certain characteristic of voice that does not fluctuate in a conventional manner. Relative measurements may also account for a characteristic of the audio-visual media, e.g., a recording that recorded the voices of the characters in a low volume. Relative measurements may be determined by comparing parameters associated with an isolated audio track with the rest of the audio tracks of the audio-visual media. Parameters of the audio track may include measured volume, pitch, pace of a speech at various points of the audio-visual media. For example, a set of parameters associated with an audio track of a speaking character may be compared with a spectrum of all identified measurements of the same character the audio-visual media to determine a degree in which the changes in parameters occurred to determine the threshold.

Relative measurements may be used in place of benchmark measurements in cases where in-scene context invalidates standard benchmark measurements. For example, a scene of an audio-visual display may contain excessive background noise, causing each speaking character involved in the scene to raise their volume to partake in a conversation. A first line of dialogue from a speaking character may be compared to a second line of dialogue from a different speaking character before or after the first line of dialogue. Measurements may determine that both speaking characters volume remains relatively steady and above average at 85 dB. Since neither the first or the second line of dialogue contain variations in volume, are similar volumes to each other, and the background noise of the scene is also detected at an increased volume, it may be determined by the text tagging and graphical enhancement server 140 that the dialogue is occurring as a regular conversation rather than two characters shouting at each other.

In another embodiment, the relative measurement can be used in conjunction with a benchmark to establish a threshold for modifying a subtitle. For example, a speaking character may utter the words of a speech in a whisper at around 35 dB for all words in a sentence until a last word of the sentence when the speaking character is surprised by an unexpected in-scene change. The last word of the sentence may be detected to be spoken at 75 dB. Such a rapid increase in volume for a particular word or phrase in a line of dialogue may be detected by relative measurements or may be compared to known benchmarks of speech by the text tagging and graphical enhancement server 140. The text tagging and graphical enhancement server 140 may further generate a modified subtitle reflecting the change.

Yet in another embodiment, a degree of change of the parameters of a speech may directly affect the modification to the subtitle associated with the speech without utilizing a threshold. In this embodiment, the modification to the subtitle may occur gradually as the speech progresses. For example, increasing volume of speech as compared to a spectrum of volume of the character or the audio-visual media may increase the size of the subtitle associated with the speech by the degree of increased volume. A gradual modification to the subtitle may also occur in conjunction with a threshold. For example, the size of the subtitle is modified after a vocal parameter exceeds a threshold, then continues to increase or decrease gradually after exceeding the threshold.

In step 260, a user may initiate playback of the audio-visual media content item with enhanced subtitles enabled, and the text tagging and graphical enhancement server may display enhanced subtitles on user devices 150. The text tagging and graphical enhancement server 140 may display enhanced subtitles in a variety of configurations based on the audio-visual media content item and based on user preferences for enhanced subtitle incorporation. In some embodiments, during playback of the audio-visual media content item, enhanced subtitles that have received modifications in step 250 and are stored in database 160 may be retrieved by the text tagging and graphical enhancement server 140, and may be displayed on user devices 150 in detected negative space adjacent to the determined position of a speaking character.

In one embodiment, display of the enhanced subtitles may be synchronized to display each word of the subtitle at a time the identified speaking character utters the word within the audio-visual media content item. In a different embodiment, display of the enhanced subtitles may be synchronized to display each letter of a word as the word is uttered by the identified speaking character within the audio-visual media content item. Display of the enhanced subtitles in synchronization with speech may hide each word and may reveal the word or letter of a word as the identified speaking character utters the word as to avoid prematurely displaying a word that has not yet been spoken, such as a scrolling text marquee.

In another embodiment, synchronized display of subtitles may include displaying a pointer above or below a first word as it is spoken and appears on screen. As the speaker continues dialogue and a second word appears on-screen, the pointer may move to the second word from the first word. The pointer and motion of the pointer may be animated to move in relation to any number of vocal parameters previously identified. For example, an identified speaker may elongate a word pronunciation, and the moving pointer may animate movement to the following word slowly, guided by the pace of the word pronunciation. In a different embodiment, the pointer may be indicated by a change in color or size in a word as the word is spoken.

Further, in another embodiment, synchronized display of subtitles may appear to be modified in various ways as speech of an identified character progresses through a sentence or phrase. Modifications to the display of subtitles based on synchronization may include color animation, size animation, gradient fading animation, transparency animation, and image overlay animation that is timed in sequence with the utterance of a word of dialogue. Modifications of displayed subtitles may be selected by the text tagging and graphical enhancement server 140 based on detected tone, emotion, volume, pitch, or in-scene context metadata and measurements of vocal parameters. For example, in a video scene of a television show, an identified speaking character may walk into view of a cherry blossom tree that is blooming and say the dialogue, "It's so beautiful today". Subtitle text may display and appear to animate in color from left to right starting as a shade of white and gradually transforming to a light pink. Additionally, cherry blossom petals may fade in from transparent to opaque, and animate across the text as if blown by wind. The subtitle modification may be based on a combination of identifications made by the text tagging and graphical enhancement server 140 relating to metadata associated with beauty, and in-scene context from identified characters and background imagery.

Figure 3:
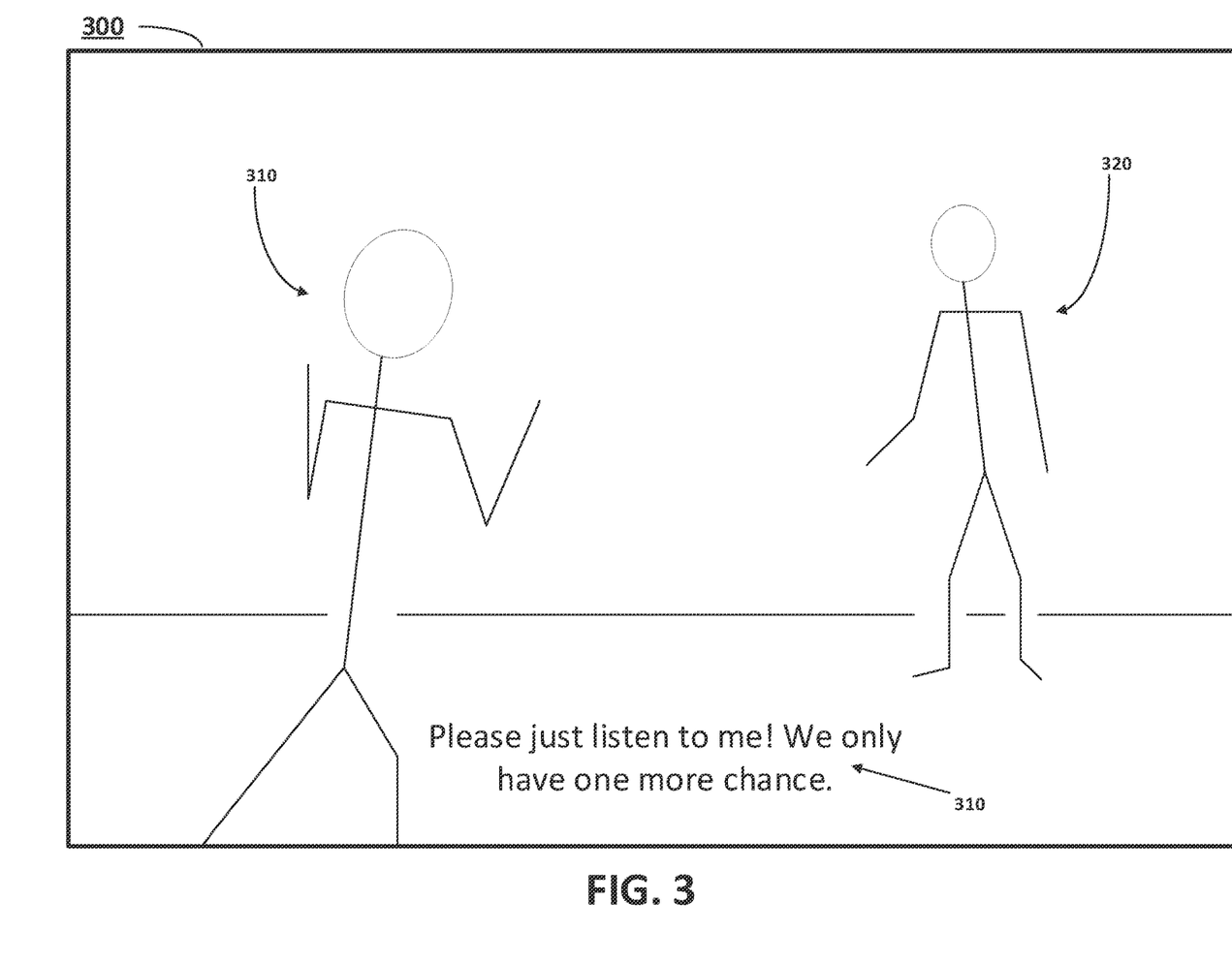
FIG. 3 is an exemplary screenshot of an audio-visual content file associated with subtitles.

FIG. 3 is an exemplary screenshot of an audio-visual content file associated with subtitles. An audio-visual display 300 contains a scene displaying a speaking character 310 and a non-speaking character 320 during delivery of a line of dialogue. Subtitle text 330 may be displayed at the top or bottom of the screen in existing systems and methods. As the speaking character begins to utter a first word of speech, (e.g. "Please"), the entire sentence of dialogue is displayed. Further, the position of the subtitle, font type, size, and color are static and monochromatic. A viewer of the audio-visual media content item may be urged to look down at the appearance of the subtitle to read the text, distracting the viewer vision from the center of the screen where in-scene context and information may continue. The distraction may cause the viewer to miss vital information to the progression of a character or story as the subtitle is read. Further, reading the subtitle as it appears may cause a viewer that reads quickly to spoil a climactic moment or emotional exchange between characters due to the subtitles immediate appearance before the speaking character finishes the dialogue.

Figure 4:
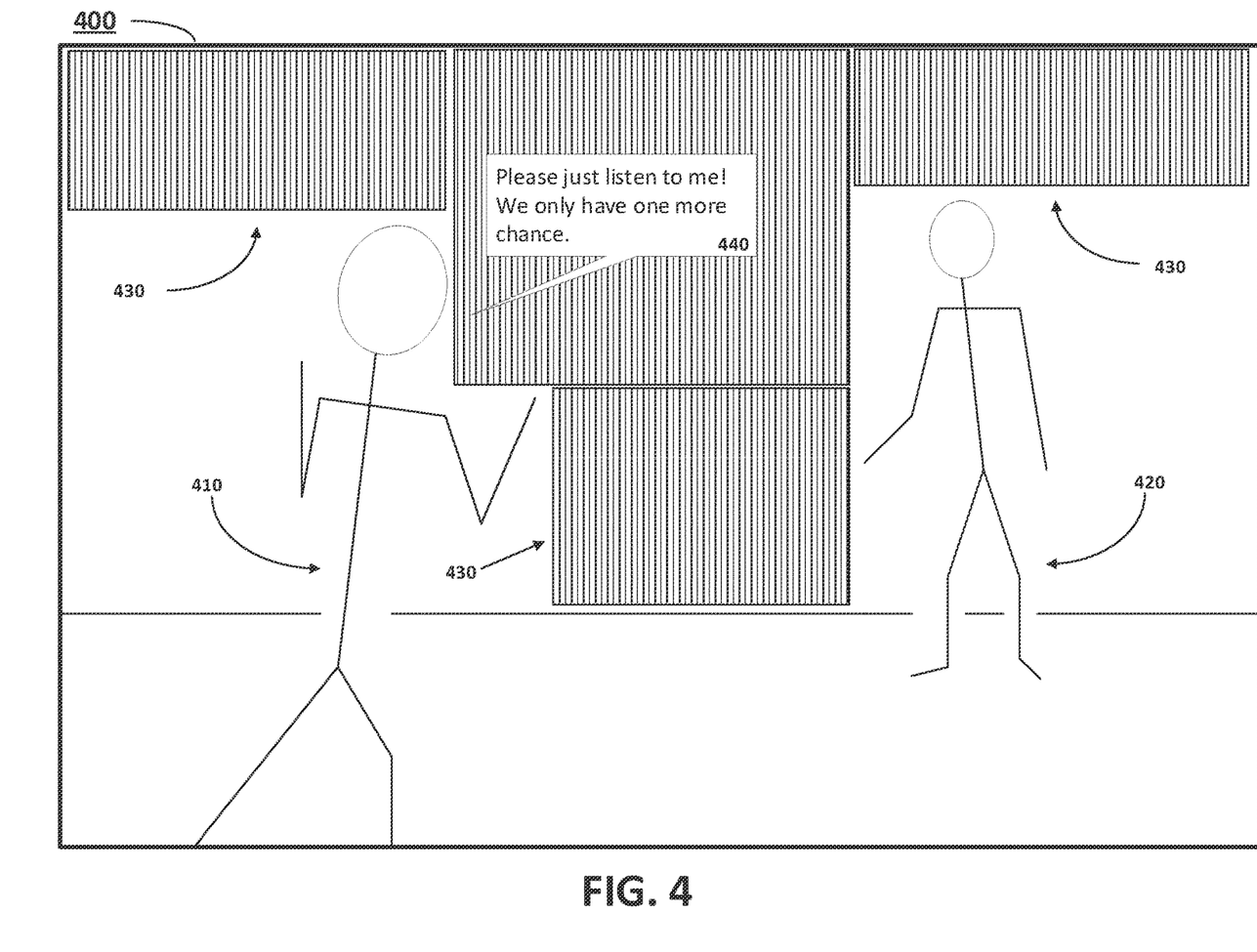
FIG. 4 is an exemplary screenshot of an audio-visual content file associated with subtitles that have been re-positioned based on identification of a speaking character and parts of a background.

FIG. 4 is an exemplary screenshot of an audio-visual content file associated with subtitles that have been re-positioned based on identification of a speaking character and parts of a background. An audio-visual display 400 contains the same audio-visual media content item scene as displayed in FIG. 3 as processed by a text tagging and graphical enhancement server 140. FIG. 4 demonstrates a visual representation of algorithms executed by a computer processor in step 240 of FIG. 2 and may not be visible to a viewer as an audio-media content item is processed by the text tagging and graphical enhancement server 140. A speaking character 410 and a non-speaking character 420 are displayed on-screen as the speaking character 410 begins vocalization of the dialogue. Background regions 430 are identified by the text tagging and graphical enhancement server 140 as remaining static throughout the scene, while either the speaking character or the non-speaking character may display movement during the scene. Subtitle text 440 may be placed adjacent to the speaking character within only the background regions 430. The subtitle text may be encompassed by a speech bubble. The speech bubble or subtitle background may vary in opacity. In the displayed embodiment, subtitle text 440 is displayed entirely complete to simulate the full region the line of dialogue will occupy when the character has finished speaking. The text tagging and graphical enhancement server 140 may simulate the full subtitle region to ensure the position selected for display contains adequate space without overlapping any speaking character or moving object of a scene.

Figure 5:
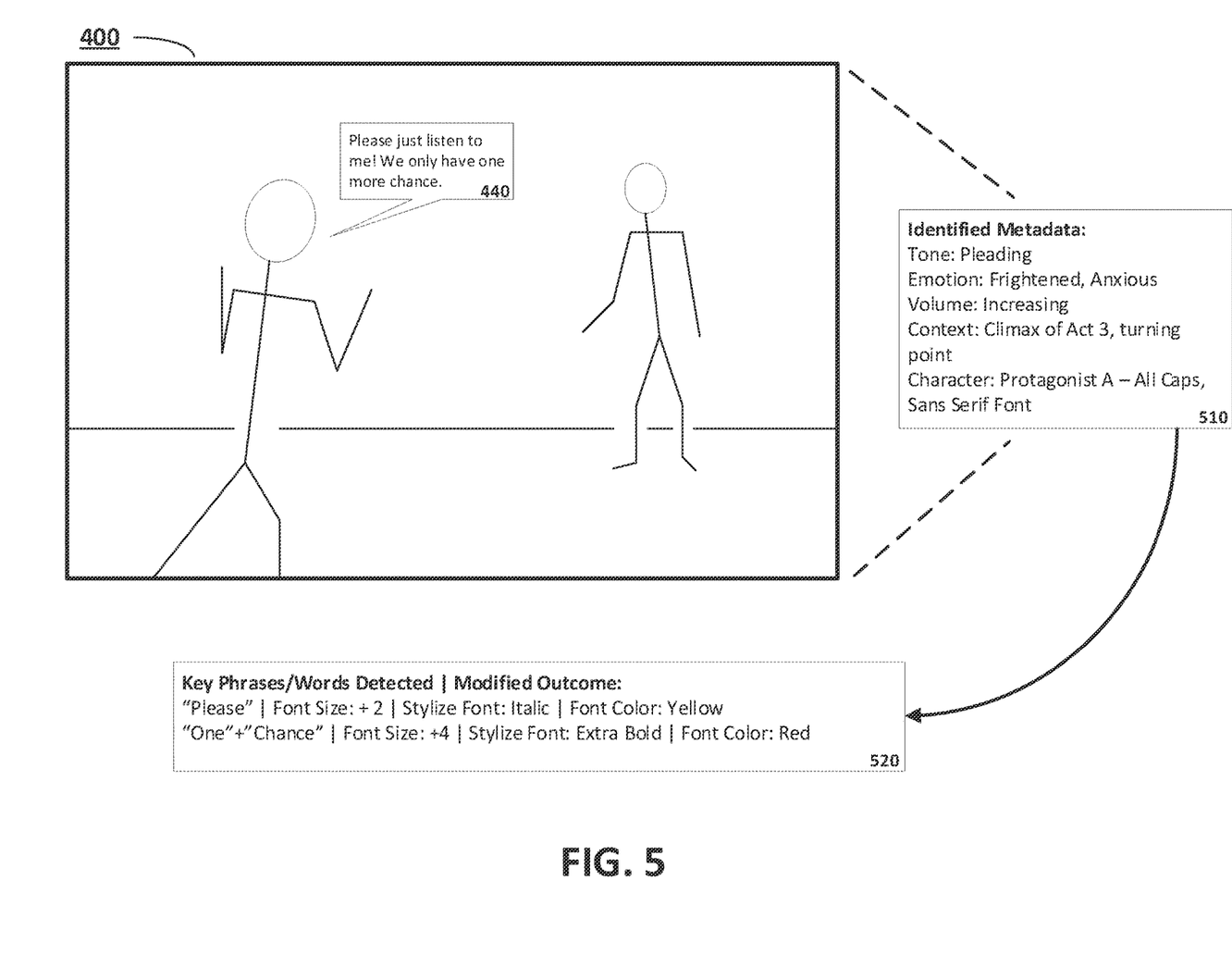
FIG. 5 illustrates exemplary parameters for analyzing and tagging audio for use in generating subtitle enhancements.

FIG. 5 illustrates exemplary parameters for analyzing and tagging audio for use in generating subtitle enhancements. FIG. 5 demonstrates a visualization of the text tagging and graphical enhancement server 140 executing step 250 of FIG. 2 after the speaking character, background, and subtitle display region have been identified in step 240 of FIG. 2, and as visualized in FIG. 4. A processor executing instructions on the text tagging and graphical enhancement server 140 may combine identified metadata 510 of the scene with phrases, words, and possible modified subtitles 520 based on rules for metadata categories stored in databases 160 to generate modifications to the subtitle text 440. In one embodiment, tonality, emotion, and volume metadata of the scene may be considered in the overall scene context and speaking character default font metadata and may be compared to information in databases 160 associated with similar grouped metadata. Key phrases and words may contain modifiers in the text enhancement library stored on databases 160. For example, increasing font size, adding italic stylization, and updating the font color to yellow may be text modifications 520 available in databases 160 when the word "Please" is spoken in a pleading tone associated with anxious emotion and supported by audio waveforms detected as anxious speech. Further, additional text modifications 520 may be selected for a phrase detected in the dialogue as speech progresses, such as the phase "one . . . chance". Databases 160 may contain modified subtitles associated with the phrase that may imply desperation, such as further increasing the font of the phrase text, adding extra bold stylization, and updating the phrase text to the color red. Any combination of modifications to a subtitle may occur gradually as the text of a subtitle appears on-screen, such as changing color from yellow to red as a gradient animation, or increasing font size growing from 14 pt to 16 pt. Further, subtitle text may be modified by tone and emotion of the speaking character as determined from facial expressions and body language of the speaker. The text tagging and graphical enhancement server 140 may combine modifications to generate the output containing the enhanced subtitle 440.

Figure 6:
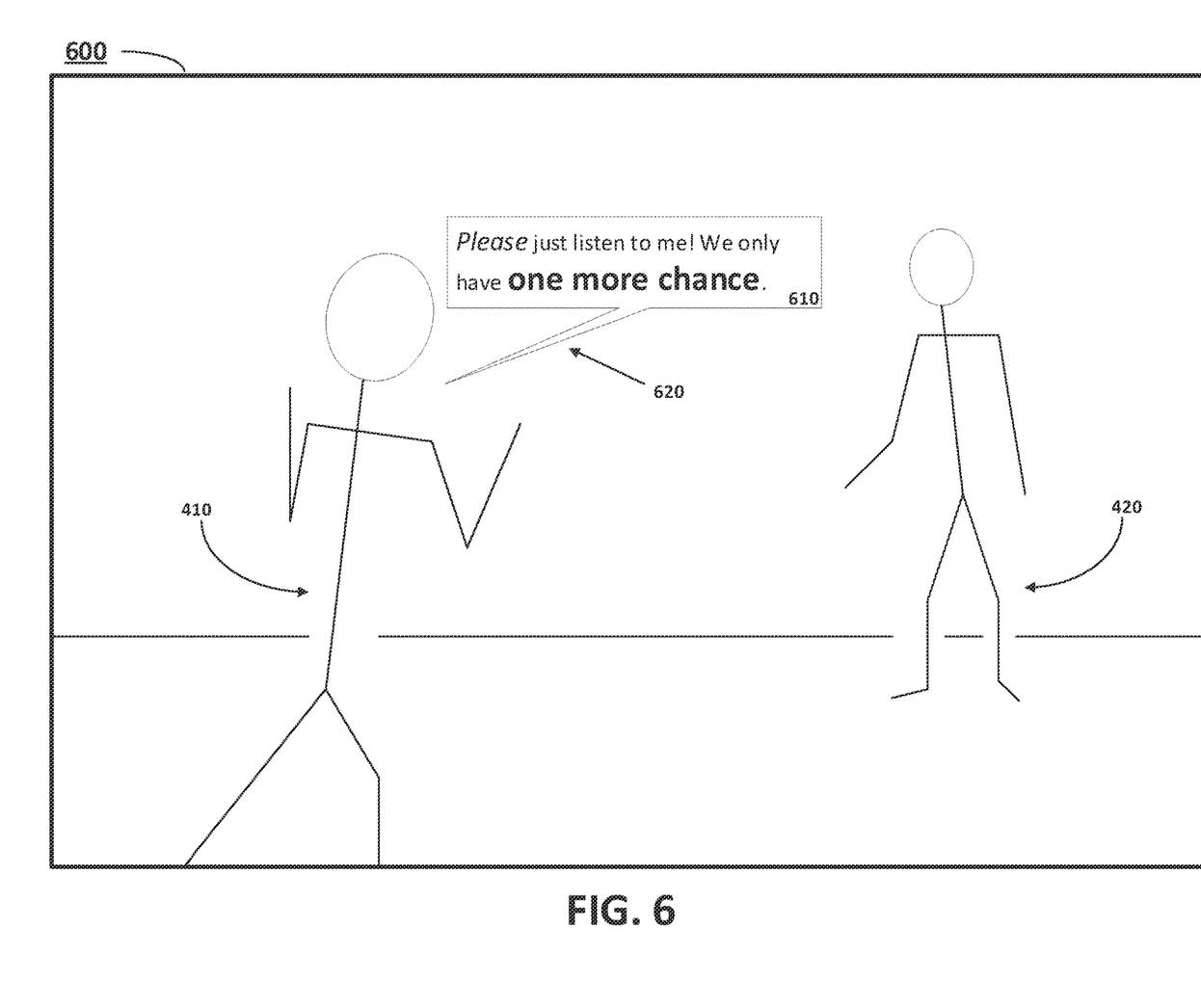
FIG. 6 is an exemplary screenshot of an audio-visual content file associated with subtitles that have been re-positioned and graphically enhanced.

FIG. 6 is an exemplary screenshot of an audio-visual content file associated with subtitles that have been repositioned and graphically enhanced. The audio-visual display 600 demonstrates an enhanced subtitle 610 displayed during playback by a viewer for the scene identified in FIG. 4 and the subtitle generated in FIG. 5. In the displayed embodiment, the enhanced subtitle 610 may incorporate the text modifications from the library, as detailed in FIG. 5, and may be displayed adjacent to the speaking character 410 in negative space positioned near the middle of the display. The enhanced subtitle 610 may also utilize additional image stylization while displayed, such as adding a pointed speech bubble 620 to point to the speaking character during dialogue vocalization, further distinguishing the speech as belonging to the speaking character 410 rather than the non-speaking character 420.

Figure 7:
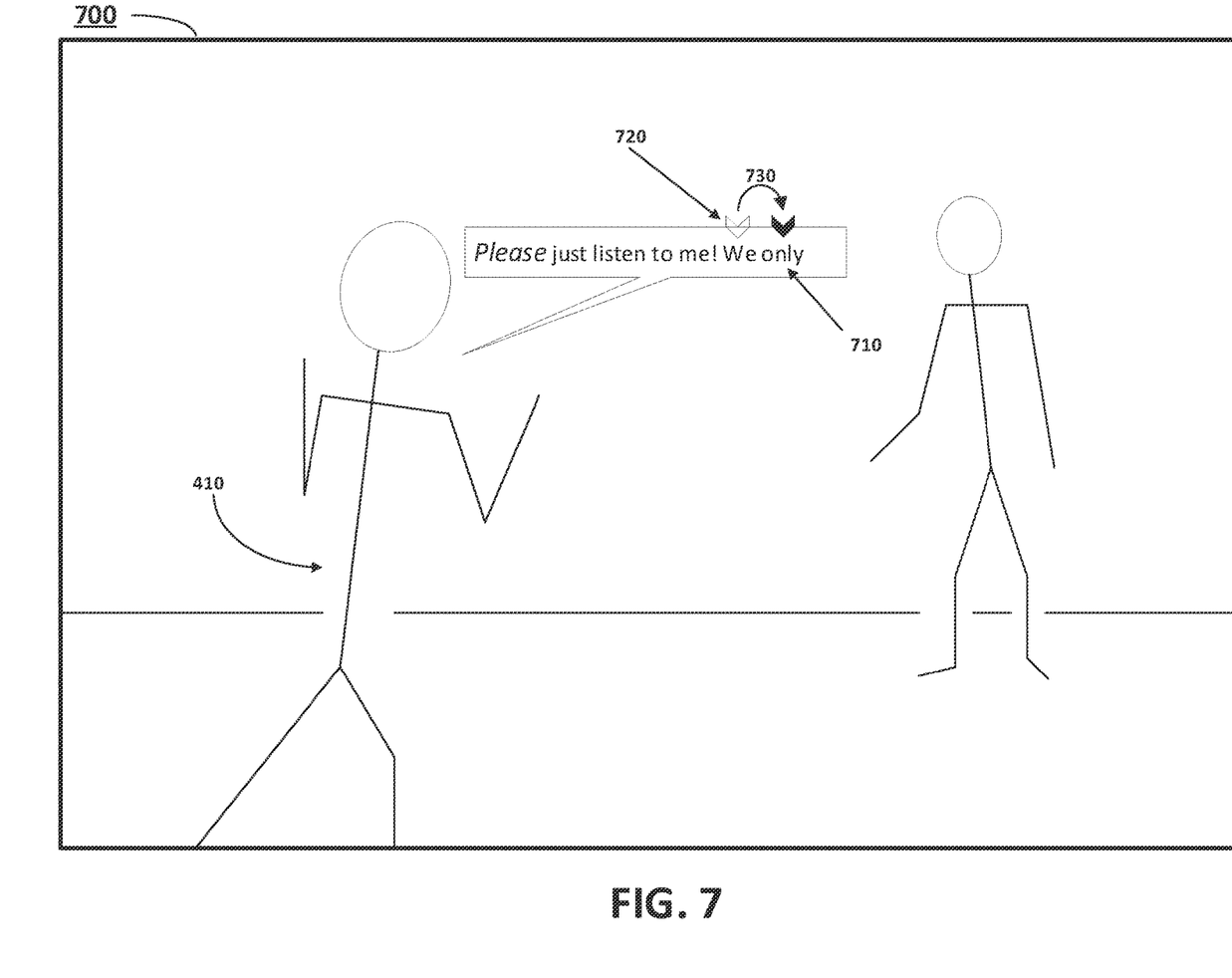
FIG. 7 is an exemplary screenshot of an audio-visual content file associated with subtitles followed by an animated pointer.

FIG. 7 is an exemplary screenshot of an audio-visual content file associated with subtitles followed by an animated pointer. An audio-visual display 700 in FIG. 7 contains a freeze frame of the same moment in playback of the audio-visual media content item in FIG. 6. In the displayed embodiment, partial text 710 in an enhanced subtitle may include a moving pointer 720 that may be animated to appear as the speaker vocalizes a word. A moving pointer 720 may rest above the word, further guiding the viewer to read along at a pace that matches the speaking characters audio. During a following moment in playback the moving pointer 720 is animated to hop 730 to a following word at the moment the speaking character vocalizes the following word.

Figure 8:
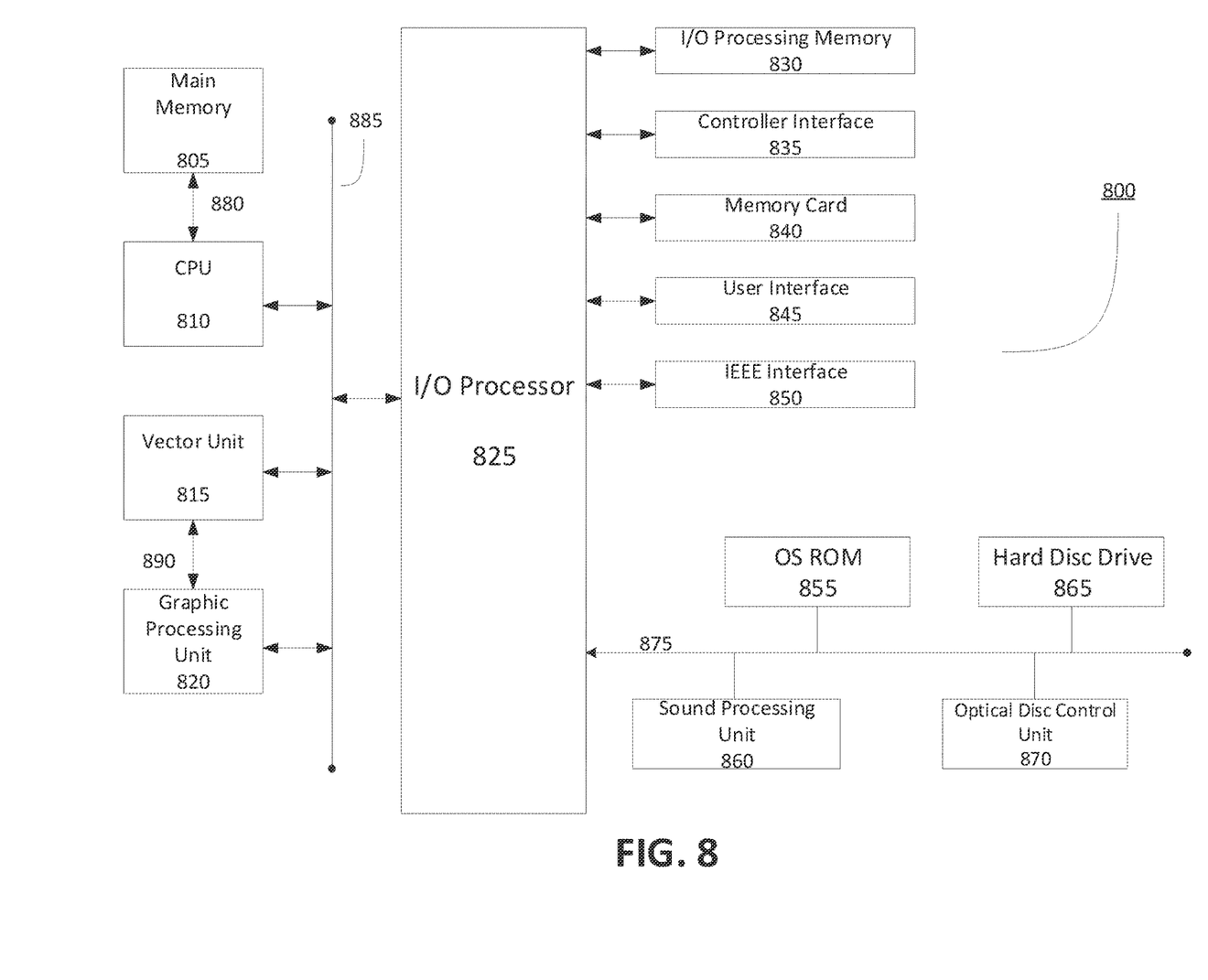
FIG. 8 is a block diagram of an exemplary electronic entertainment system that may be used in embodiments of the present invention.

FIG. 8 is a block diagram of an exemplary electronic entertainment system that may be used in embodiments of the present invention. The entertainment system 800 of FIG. 8 includes a main memory 805, a central processing unit (CPU) 810, vector unit 815, a graphics processing unit 820, an input/output (I/O) processor 825, an I/O processor memory 830, a controller interface 835, a memory card 840, a Universal Serial Bus (USB) interface 845, and an IEEE interface 850. The entertainment system 800 further includes an operating system read-only memory (OS ROM) 855, a sound processing unit 860, an optical disc control unit 870, and a hard disc drive 865, which are connected via a bus 875 to the I/O processor 825.

Entertainment system 800 may be an electronic game console. Alternatively, the entertainment system 800 may be implemented as a general-purpose computer, a set-top box, a hand-held game device, a tablet computing device, or a mobile computing device or phone. Entertainment systems may contain more or less operating components depending on a particular form factor, purpose, or design.

The CPU 810, the vector unit 815, the graphics processing unit 820, and the I/O processor 825 of FIG. 8 communicate via a system bus 8135. Further, the CPU 810 of FIG. 8 communicates with the main memory 805 via a dedicated bus 880, while the vector unit 815 and the graphics processing unit 820 may communicate through a dedicated bus 890. The CPU 810 of FIG. 8 executes programs stored in the OS ROM 855 and the main memory 805. The main memory 805 of FIG. 8 may contain pre-stored programs and programs transferred through the I/O Processor 825 from a CD-ROM, DVD-ROM, or other optical disc (not shown) using the optical disc control unit 870. I/O Processor 825 of FIG. 8 may also allow for the introduction of content transferred over a wireless or other communications network (e.g., 4$, LTE, 3G, and so forth). The I/O processor 825 of FIG. 8 primarily controls data exchanges between the various devices of the entertainment system 800 including the CPU 810, the vector unit 815, the graphics processing unit 820, and the controller interface 835.

The graphics processing unit 820 of FIG. 8 executes graphics instructions received from the CPU 810 and the vector unit 815 to produce images for display on a display device (not shown). For example, the vector unit 815 of FIG. 8 may transform objects from three-dimensional coordinates to two-dimensional coordinates, and send the two-dimensional coordinates to the graphics processing unit 820. Furthermore, the sound processing unit 860 executes instructions to produce sound signals that are outputted to an audio device such as speakers (not shown). Other devices may be connected to the entertainment system 800 via the USB interface 845, and the IEEE interface 850 such as wireless transceivers, which may also be embedded in the system 800 or as a part of some other component such as a processor.

A user of the entertainment system 800 of FIG. 8 provides instructions via the controller interface 835 to the CPU 810. For example, the user may instruct the CPU 810 to store certain game information on the memory card 840 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of subtitle enhancement, the method comprising:
   receiving information regarding a media asset associated with an audio-visual content presentation that includes one or more speaking characters;
   identifying that a set of sounds from the audio-visual content presentation corresponds to speech by one of the speaking characters;
   analyzing the set of sounds corresponding to the identified speaking character to identify one or more vocal parameters, each vocal parameter measuring an element of one of the sounds; and
   generating a display of subtitles that is synchronized to the speech of the identified speaking character within the audio-visual content presentation, wherein an appearance of the subtitles is modified based on the identified vocal parameters for each of the corresponding sounds, and wherein modifying the appearance of the subtitles further includes applying one or more images or animated effects that correspond to one or more objects of a current background of the audio-visual content presentation.

2. The method of claim 1, further comprising determining a placement for the subtitles associated with the set of sounds, wherein the subtitles are placed based on a location of the identified speaking character within the audio-visual content presentation.

3. The method of claim 1, further comprising identifying one or more background portions of the audio-visual content presentation, wherein the background portions are not occupied by the identified speaking character within the audio-visual content presentation, wherein the subtitles associated with the set of sounds are placed in the background.

4. The method of claim 1, further comprising assigning one or more metadata categories to the set of sounds based on the vocal parameters, wherein the appearance of the subtitles is based on the assigned metadata categories.

5. The method of claim 4, wherein the metadata categories includes at least one of type of tonality, type of emotion, volume level, in-scene context, and character.

6. The method of claim 5, further comprising identifying the in-scene context based on one or more other sets of sounds occurring before and after the set of sounds.

7. The method of claim 4, wherein different metadata categories are assigned to sound elements associated with different speaking characters.

8. The method of claim 7, wherein subtitles associated with different speaking characters are modified to have different appearances based on the different assigned metadata categories.

9. The method of claim 1, further comprising storing a library of text enhancements in memory, wherein the appearance of the subtitles is modified based on text enhancements selected from the library.

10. The method of claim 1, further comprising synchronizing the speech to the subtitles by displaying each word of the subtitles at a time that the identified speaking character utters the word within the audio-visual content presentation.

11. The method of claim 1, wherein generating the synchronized display of the subtitles includes displaying an animated pointer that indicates in real-time which word of the subtitles is being spoken by the identified speaking character.

12. The method of claim 11, further comprising modifying the animated pointer based on the appearance of the subtitles.

13. The method of claim 1, wherein the appearance of the subtitles is modified by changing at least one of a size, color, font or typeface, typographical emphasis, animation effect of one or more individual words within the subtitles.

14. The method of claim 1, wherein the appearance of the subtitles is modified gradually as the speech progresses.

15. A system of subtitle enhancement, the system comprising:
   a communication interface that communicates over a communication network, wherein the communication interface receives information regarding a media asset associated with an audio-visual content presentation that includes one or more speaking characters; and
   a processor that executes instructions stored in memory, wherein the processor executes the instructions to:
      identify that a set of sounds from the audio-visual content presentation corresponds to speech by one of the speaking characters;
      analyze the set of sounds corresponding to the identified speaking character to identify one or more vocal parameters, each vocal parameter measuring an element of one of the sounds; and
      generate a display of subtitles that is synchronized to the speech of the identified speaking character within the audio-visual content presentation, wherein an appearance of the subtitles is based on the identified vocal parameters for each of the corresponding sounds, and wherein modifying the appearance of the subtitles further includes applying one or more images or animated effects that correspond to one or more objects of a current background of the audio-visual content presentation.

16. A non-transitory computer-readable storage medium, having embodied thereon a program, the program being executable by a processor to perform a method of subtitle enhancement, the method comprising:

receiving information regarding a media asset associated with an audio-visual content presentation that includes one or more speaking characters;

identifying that a set of sounds from the audio-visual content presentation corresponds to speech by one of the speaking characters;

analyzing the set of sounds corresponding to the identified speaking character to identify one or more vocal parameters, each vocal parameter measuring an element of one of the sounds; and generating a display of subtitles that is synchronized to the speech of the identified speaking character within the audio-visual content presentation, wherein an appearance of the subtitles is based on the identified vocal parameters for each of the corresponding sounds, and wherein modifying the appearance of the subtitles further includes applying one or more images or animated effects that correspond to one or more objects of a current background of the audio-visual content presentation.

\* \* \* \* \*